United States Patent [19]
Simeon

[11] 3,980,258
[45] Sept. 14, 1976

[54] VERTICAL NAVIGATION STEERING CONTROL SYSTEM FOR AIRCRAFT

[75] Inventor: Peter Eberhard Simeon, Edmonds, Wash.

[73] Assignee: The Boeing Company, Seattle, Wash.

[22] Filed: June 27, 1975

[21] Appl. No.: 591,250

[52] U.S. Cl. .............................. 244/182; 235/150.22; 235/150.26; 244/186; 318/584; 244/189
[51] Int. Cl.² .......................................... G05D 1/08
[58] Field of Search ................ 73/178 R; 235/150.2, 235/150.22, 150.26, 150.27; 244/77 A, 77 D, 77 M, 181, 182, 183, 186, 187, 194, 189; 318/581, 504; 340/27; 343/6 R, 6 DF, 7 ED, 112 C, 112 S

[56] References Cited
UNITED STATES PATENTS

| | | |
|---|---|---|
| 3,313,152 | 4/1967 | Kulda et al. .................... 244/77 D X |
| 3,398,267 | 8/1968 | Hattendorf...................... 235/150.26 |
| 3,681,580 | 8/1972 | Gwathmey .................... 244/77 D X |
| 3,805,235 | 4/1974 | Foster et al. .................. 244/77 M X |

*Primary Examiner*—Stephen G. Kunin
*Attorney, Agent, or Firm*—Conrad O. Gardner

[57] ABSTRACT

A vertical navigation steering control for aircraft for providing vertical steering of an aircraft along flight paths defined by waypoints which recognizes the problems introduced by lateral steering and accounts for shortening of horizontal distance between waypoints due to lateral path changes. Further features include means for capturing a NAV path, following a path between waypoints, transitioning from one path to another at a waypoint, and means for protection against excessive climb rates.

9 Claims, 8 Drawing Figures

VERTICAL NAVIGATION STEERING CONTROL SYSTEM FOR AIRCRAFT

This invention relates to vertical navigation steering control for an aircraft and more particularly to a method and means for vertical steering of an aircraft along paths defined by waypoints either automatically by autopilot or through pilot utilization of a flight director. The present system recognizes problems introduced by a lateral steering and provides a method of computing a vertical curve between straight line paths.

Various state of the art attempts at vertical flight path control in the patent literature have included:

U.S. Pat. No. 3,740,004 to Doniger et al. issued June 19, 1973 showing a system having a control equation $\theta_C = K_D(A_C - A_S) + K_R(\gamma - A_S)$ and $\gamma = \tan -1H/V_T$ which makes it air referenced (neglects winds), $A_C$ is a ground referenced angle, and $A_S$ is the angle between the aircraft velocity vector and the line of sight from aircraft to aimpoint; which may be contrasted with the present system equation $\overset{\circ}{h}_C = \overset{\circ}{h}_{CO} + k(h_{CO} - h)$ where $h_{CO}$, $\overset{\circ}{h}_{CO}$ are functions of waypoint geometry and groundspeed.

U.S. Pat. No. 3,545,703 to Doniger et al. issued Dec. 8, 1970 showing a system including circular arcuate flight path changes, overshoot control, and path capture which, however, only performs the limited task in the figure.

U.S. Pat. No. 3,240,446 to Miller issued Mar. 15, 1966 shows a method also utilized in the present system for providing the level flight segment capture in the profile mode, however not including a commanded altitude reference in dial form. Also, the referenced system provides asymptotic altitude change (no overshoot control).

U.S. Pat. No. 3,644,722 to Hobbs et al., issued Feb. 22, 1972, a vertical control system which is not closed loop nor makes provision for smooth transition between flight legs.

U.S. Pat. No. 3,666,929 to Menn issued May 30, 1972, a flight control system for following a multi stage descent profile utilizing a successive linear approximation technique (to curved vertical transition) which does not account for path shortening.

U.S. Pat. No. 3,641,323 to Hughes et al. issued Feb. 8, 1972, a speed altitude command system which computes control parameters from continuous comparison with a predetermined maximum efficiency profile, whereas the present system definition of profile is a maximum thrust, constant airspeed (with recognition of speed limits).

U.S. Pat. No. 3,705,306 to Lydon et al. issued Dec. 5, 1972, an aircraft navigation system with vertical guidance which is exemplary of straight-line NAV (navigation), but which is not a coupled system, provides no flares nor protection; and U.S. Pat. No. 3,786,505 to Rennie issued Jan. 15, 1974, a self contained navigation system showing computerized landing approach, vertical and horizontal steering maneuvers, and includes programmed "climbing turn" provisions.

It is accordingly an object of the present invention to provide means in a vertical navigation system for following of vertical straight line paths defined by waypoints with further protection against over and underspeed.

It is another object of the present invention to provide means in a vertical navigation system which takes into account the shortening of horizontal distance between waypoints due to lateral path changes.

It is yet a further object of the present invention to provide switchless signal path command signal selection means responsive to signals representative of calibrated airspeed error, navigation path error, and angle of attack error.

It is still another object of the present invention to provide means for generating a calibrated airspeed error signal for utilization in a vertical navigation system by comparing calibrated airspeed (CAS) with a speed reference signal representative of maximum permissable speed.

In accordance with an embodiment of the present navigation control system, means are provided for: capturing a NAV path, following a path between waypoints, protecting against excessive climb rates, protecting against excessive speeds, transitioning from one path to another at a waypoint, and providing efficient climbouts under NAV control.

The above and further objects and features of the present system will become apparent and the invention best be understood from the following description when read in conjunction with the accompanying drawings in which:

Figure 1:
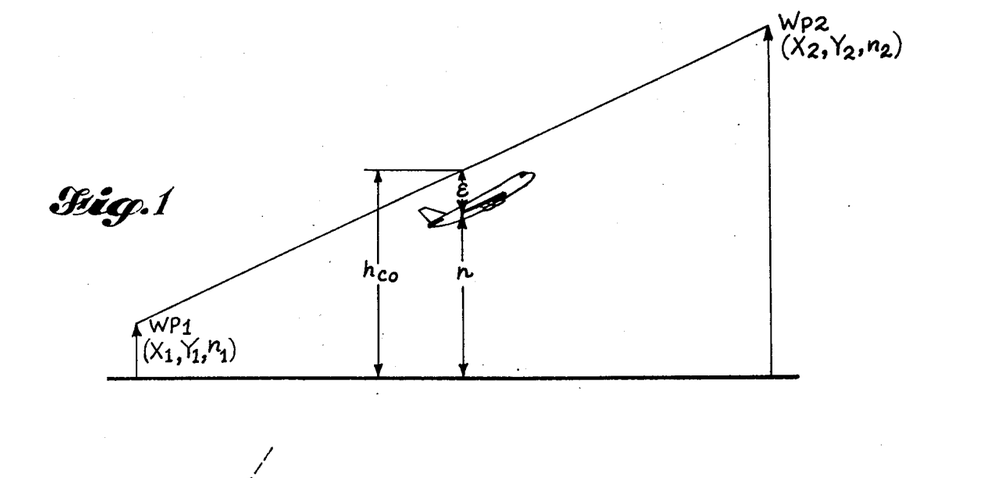
FIG. 1 is a diagrammatic representation of straight line navigation between waypoints.

Turning now to FIG. 1 and a consideration of STRAIGHT LINE NAVIGATION, it will be noted that it is a primary objective to provide a vertical track deviation signal which allows the aircraft to ascend along a computed path and reach a desired altitude at a waypoint. In practice, this is only possible when no slope change occurs at the waypoint. For a change in slope, a vertical error at and near the waypoint must be accepted, unless an artifical way-point is inserted. This situation is similar in lateral steering.

Figure 6:
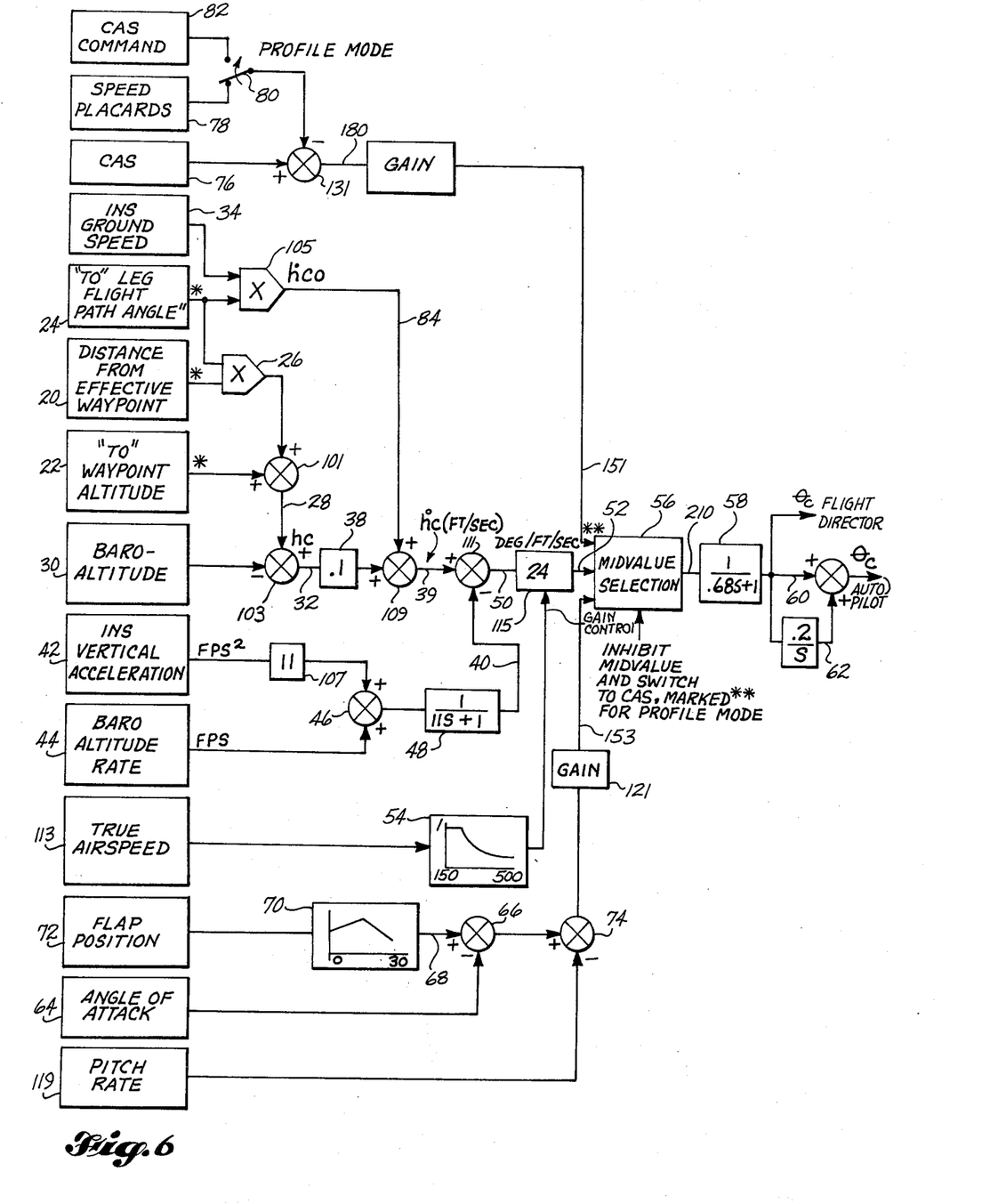
FIG. 6 is a block diagram schematic of the present control system implementing vertical navigation including means for providing straight line and curve transition, an alternative means for calculating and providing such straight line and curve transition being shown in the aforementioned FIG. 4.

The term straight should be qualified to mean straight relative to a surface defined by zero barometric altitude. The reference surface is warped by both the earth's curvature and local atmospheric pressure variations. An objective of the present control system of FIG. 6 is to command the aircraft to follow a path connecting the waypoints WP1 and WP2, defined by coordinates $(x_1, y_1, h_1)$, and $(x_2, y_2, h_2)$ respectively as shown in FIG. 1. Altitude change from one waypoint occurs at a constant rate proportional to distance traveled. In a terminal area, way-points are close and paths are straight lines except near waypoints.

Figure 2:
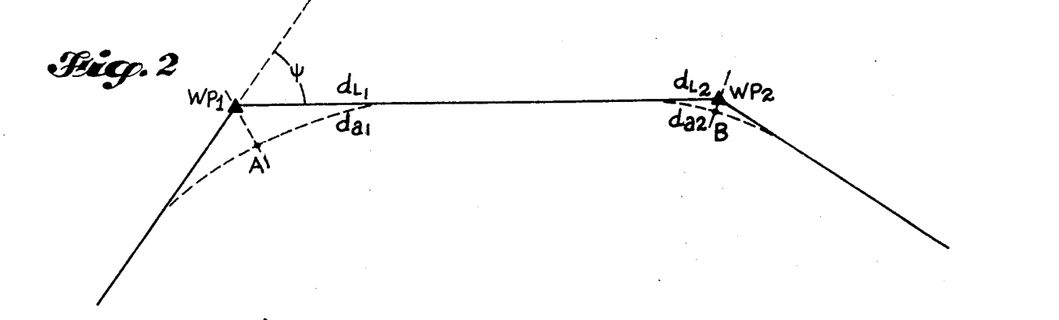
FIG. 2 is a diagrammatic representation of a NAV track illustrative of the horizontal situation.

The inherent commanded altitude rate is determined from the equation:

$$\overset{\circ}{h}_{co} = \gamma_c V_G \qquad (1)$$

where $V_G$ is ground speed and $\gamma_C$ is the slope factor, a term describing flight path angle. To compute the value of $\gamma_C$, consideration must be given to the lateral situation associated with the vertical situation of FIG. 1. This is shown in FIG. 2. In the presence of lateral track changes, it is important at this time to note that the effective distance between way-points may not be computed from the waypoint coordinates and the geometry of FIG. 1 alone. The distance of interest is the ground distance between points A and B in FIG. 2. Path length may be computed if the leg changes are assumed to be circular arcs.

Under the assumption that track changes are small, or that lateral steering improvements are made, the analysis herein made for the V-NAV (vertical navigation) problem is valid.

Let $\psi$ be the track angle change and $R_L$ be the radius of turn at a waypoint. Distance and time from lateral leg switch to the waypoint are $d_L$ and $T_L$. Then $$R_L = d_L \cot \psi/2 \qquad (2)$$

and, with $\psi$ in radians, the arc distance $d_a$ $$d_a = d_L (\psi/2) \cot \psi/2 \qquad (3)$$

The equation for ground distance between effective waypoints A and B is $$D = \sqrt{(x_2-x_1)^2 + (y_2-y_1)^2} - d_c \qquad (4)$$

where $d_c$ is the correction for the curved paths $$d_c = d_{L1}(1 - \psi_1/2 \cot \psi_1/2) + d_{L2}(1 - \psi_2/2 \cot \psi_2/2) \qquad (5)$$

The slope factor in equation (1)

$$\gamma_c = h_2 - h_1/D \qquad (6)$$

Figure 8:
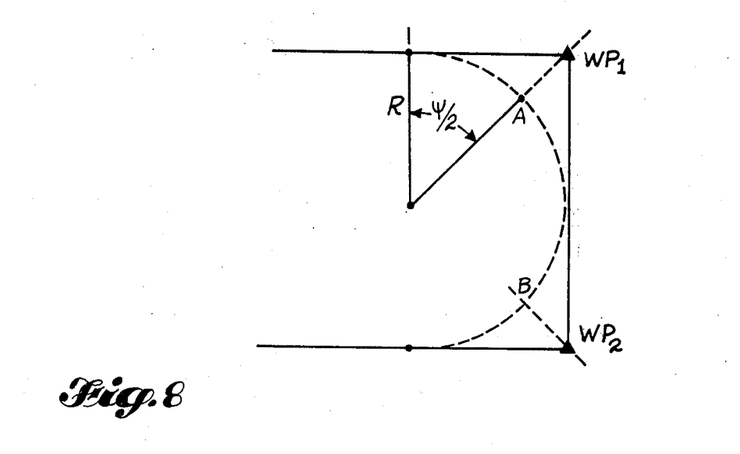
FIG. 8 shows an error analysis diagram for distance computation.

It is seen that except in the case of no horizontal track change, the slope factor and therefore the commanded altitude rate on the straight line leg differs slightly from a value arrived at by simply combining altitude change and waypoint to waypoint distance. The correction quantity $d_c$ is not negligible, as is shown in FIG. 8 and description hereinafter given in connection therewith under the heading ERROR ANALYSIS FOR DISTANCE COMPUTATION. The commanded altitude rate of equation (1) is modified by a term proportional to vertical error E from the prescribed flight path according to the equation $$\overset{\circ}{h}_c = \overset{\circ}{h}_{co} + kE \qquad (7)$$

$k$ is the basic path gain and is chosen to satisfy stability and performance criteria. The vertical error E is the difference between commanded altitude $h_{co}$ (see FIG. 1 description) and measured (barometric) altitude $h$.

$$E = h_{co} - h \qquad (8)$$

It is now seen that the waypoint and path altitudes achieved are barometric, not geometric altitudes. The polarity of E is of importance, errors below the prescribed path being defined as positive as, in general, all up commands. The commanded altitude is determined from:

$$h_{co} = h_1 + d\gamma_c \qquad (9)$$

$d$ is the along the path ground distance travelled from the effective waypoint A, excluding all track deviations. The quantity must be continuously evaluated; and expressed in vector language, it is the time integral of the inner product of the velocity vector and a unit vector with the direction of the desired track.

ERROR ANALYSIS FOR DISTANCE COMPUTATION

Suppose the system utilizes the actual distance between waypoints instead of the curvilinear distance from point A to point B shown in FIG. 8. The most critical case perhaps is a base leg designed by airtraffic control such that as soon as one curvilinear path ends the next one begins. At the same time, the aircraft changes altitude (which should be possible in a desired area navigation system). Then, the computed path distance between WP1 and WP2 shown in FIG. 2 is too long by the factor $\psi/2 \cot \psi/2 = 0.785$. Thus, the steady state commanded altitude rate would be too low by the same factor.

Returning now to FIG. 2, it can be observed that where the unit vector along the track is denoted $\bar{U}$ and the time elapsed since passage of the effective waypoint A is $t_L$, then:

$$d = \int^{t_L} (\bar{U} \cdot V_G) dt$$

and in computation, coordinate equivalents of the above equation are utilized to evaluate the quantity $d$. In this connection, reference may be made to the commentary in Draft No. 3 of Part II of ARINC characteristic 583, Section 3.2.2.1 which defines along-track-distance which states:

"Along track distance, i.e. distance to a line through the waypoint perpendicular to the desired track (wayline) is the preferred input to the V NAV computer because it has the effect of generating a plane surface for the aircraft to ascend or descend on. This feature is invaluable if the aircraft is off course."

As pointed out by equation (4), a need exists to predict path length at the waypoint, in order to distribute climb rate uniformly over the flight leg. This establishes the requirement for well-defined paths in the lateral axis.

Figure 4:
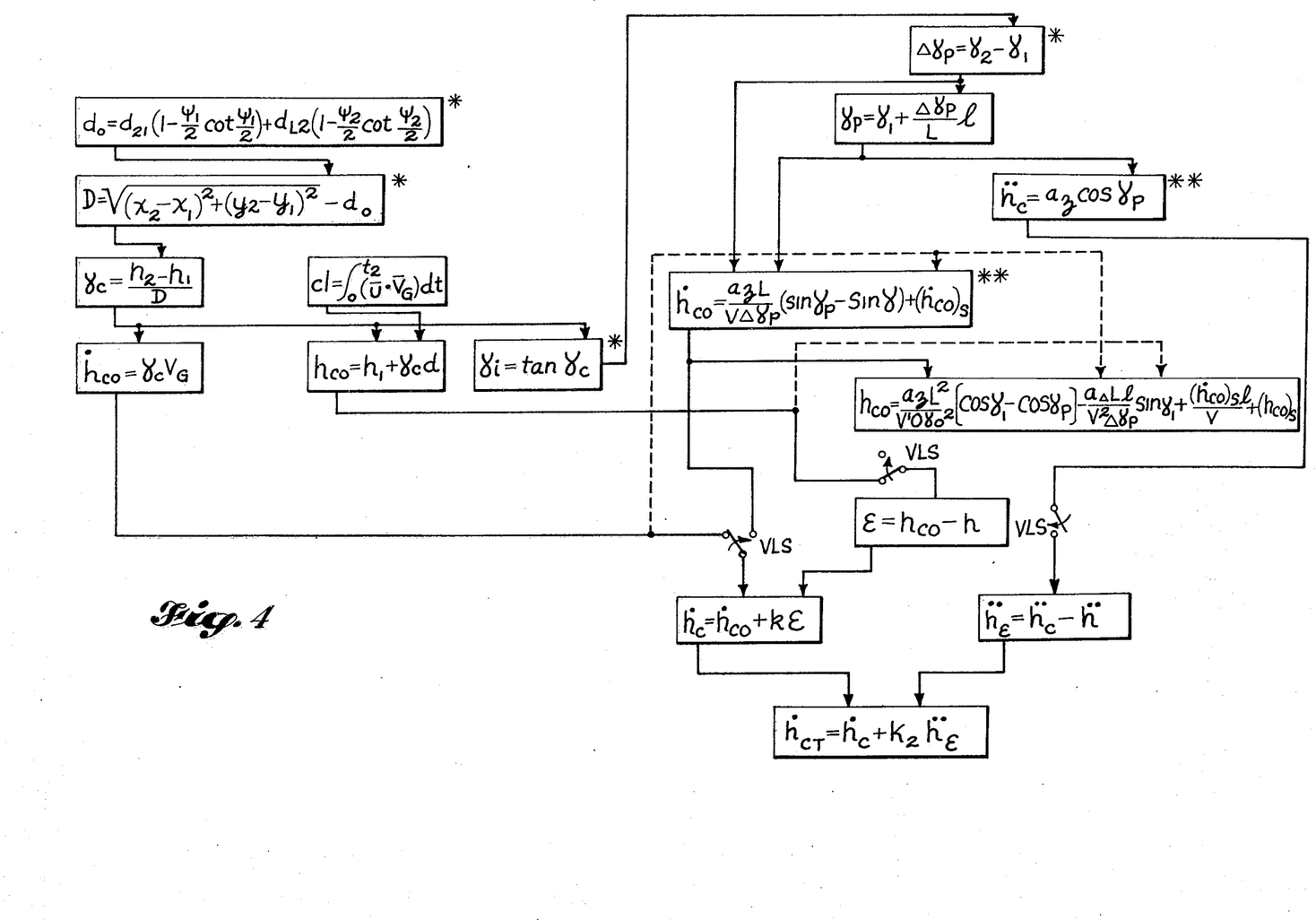
FIG. 4 is illustrative of the relevant stages of vertical navigation path computation made continuously to provide straight line and curve transition giving particular attention to normal acceleration incurred.

The equations necessary to the various stages of computation of a straight line track are shown in FIG. 4. The final equation of FIG. 4 is redundant and somewhat inconsistent with the implementation shown in the system block diagram of FIG. 6. However, the inconsistency consists in the relative order of summation of the $h$ feedback signal; and, the order is irrelevant in a linear system.

While complete vertical navigation implementation is shown in the system of FIG. 6, an alternate means of providing straight line and curve transition, however with particular attention to normal acceleration incurred, is shown in FIG. 4 and described immediately hereinafter under the caption CONSTANT ACCELERATION MEANS (optional only). This optional means is an alternate means of supplying the signal 39 in the system embodiment of FIG. 6.

CONSTANT ACCELERATION MEANS

(optional only)

Preliminarily, it should be noted that the computations done in FIG. 4 are done continuously and that the computations denoted by a single asterisk (*) are computed once per waypoint and that the computations denoted by a double asterisk (**) are done neglecting the second term of vertical acceleration.

The objectives achieved by the vertical curve transition path control provided include:
  a. Minimization of passenger discomfort due to vertical acceleration by distributing vertical acceleration uniformly over a time span. A specified vertical acceleration over a time period is required to achieve a vertical speed change;
  b. Minimization of the vertical error between the actual flight path and the straight line segments at their intersection. The requirements (a) and (b) are in direct conflict and a compromise must be found;
  c. Minimization of path overshoots. Absence of overshoots enhance the "captain" appeal of the system. Overshoots result in unnecessary vertical accelerations in opposite directions, contributing to passenger discomfort.

As set out above, a constant normal acceleration is desirable for vertical path transition. Constant acceleration normal to the flight path implies that the flight path is circular. Thus, a number specifying normal acceleration level may be stored and a polarity assigned depending on whether the curve transition is toward a decreased or increased flight path angle. A positive upward acceleration is defined positive.

Vertical acceleration is related to normal acceleration by the local flight path angle $\gamma_P$. The relationship for the desired vertical acceleration becomes $$\overset{\circ\circ}{h_c} = a_z \cos \gamma_P = \overset{\circ}{V} \sin \gamma_P \qquad (11)$$

As an aside to a better understanding of the preceeding equation, it should be noted that vertical speed $\dot{h}_C$ is defined in an earth referenced coordinate system as $h_C = V \sin \gamma_P$ and differentiation thereof yields $$\overset{\circ\circ}{h_c} = V\dot{\gamma}_P \cos \gamma_P + \overset{\circ}{V} \sin \gamma_P$$

Normal acceleration is defined as $a_z = V\dot{\gamma}_P$ and by substitution, equation (11) above is obtained, that is $$\overset{\circ\circ}{h_c} = a_z \cos \gamma_P + \dot{\nu} \sin \gamma_P$$

If the exact relationship of equation (11) is not required for the navigation task, the approximation $\overset{\circ\circ}{h} \approx a_z$ may be sufficient.

Flight path angle $\gamma_P$ undergoes a variable rate of change during a circular arc path transition starting with the value for the arrival path $\gamma_1$ and ending with the value for the departure path $\gamma_2$. The rate of change may be variable with respect to time to accommodate changes of speed or wind but is constant with respect to distance $$\gamma_P = \gamma_1 + kl \qquad (12)$$

Commanded vertical speed may be obtained by integrating equation (11)

$$\dot{h}_{co} = \int \overset{\circ\circ}{h_c} dt + (\dot{h}_{co})_s \qquad (13)$$

$(\dot{h}_{co})_s$ is the last value computed on the straight line arrival leg per equation (1). The commanded altitude, equivalent to the output of equation (9) for the straight line leg, is obtained by integrating equation (13) and providing the last value of equation (9) as initial condition.

$$h_{co} = \int_o^t \dot{h}_{co} dt + (h_{co})_s \qquad (14)$$

Figure 3:
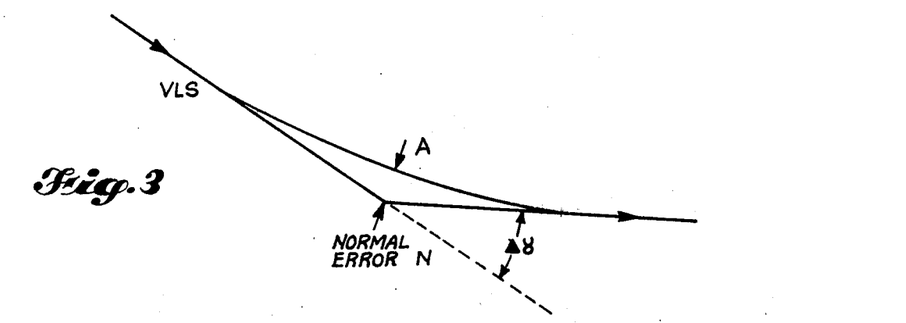
FIG. 3 is a diagrammatic representation illustrative of parameters relevant to vertical way-point change.

The count time $t$ during vertical path transition starts at vertical leg switch VLS; at VLS the straight line computation of FIG. 3 ceases and is supplanted by the computation of equations (11) through (15) and shown in FIG. 4.

The relationship between normal acceleration and path angle change is $$a_z = V\dot{\gamma}_P \qquad (15)$$

V here is ground referenced speed. FIG. 3 below shows parameters relevant to vertical waypoint change. T is the total time used for waypoint transition.

Re-expressing equation (16) with $\dot{\gamma} = \Delta\gamma/T$ and solving for T results in $$T = V\Delta\gamma/a_z \qquad (16)$$

Normal error N defined by FIG. 4 is related to flight path change and vertical turn radius R by $$N = R (\sec \Delta\gamma/2 - 1) \qquad (17)$$

Turn radius may be re-expressed in terms of speed and normal acceleration.

$$R = \nu^2/a_z \qquad (18)$$

The equation for normal error becomes $$N = V^2/a_z (\sec \Delta\gamma/2 - 1) \qquad (19)$$

Worst case vertical maneuvers include transitions from level flight to maximum rate of descent and from maximum rate of descent to level flight. Path changes of up to 7° may be encountered without use of speed brakes. Winds of 150 knots are not uncommon at altitudes. As a result, we must use ground reference speeds of up to 1150 ft/sec in design considerations.

For the case of tail wind at $M = 0.86$ and a maximum rate of descent $V = 1150$ ft/sec, $a_z = 3.2$ ft/sec², $\Delta\gamma = 7°$ the resulting $T = 44$ sec, $N = 774$ ft The above figure importantly establishes a maximum T and $a_z$. For all maneuvers less critical than the above, four design options to be noted here exist, designated 1, 2, 3, and 4 below. The above signifies a leg switching time $\tau = T/2$ from the effective waypoint A shown in FIG. 3.
  1. Retain $\tau = 22$ sec for all vertical maneuvers resulting in reduced $a_z$ levels and relatively large normal errors N.
  2. Retain $a_z = 0.1$ g and decrease T, thereby reducing N.

3. Accept equal penalties in N, and $a_z$, and diminish both equally from the worst case cited above. This later solution would require additional computing capacity.
4. The computer arrives at possible vertical and lateral switching times and then selects one switching time for both vertical and lateral waypoint switching. The time selected is the larger of the two.

The four possibilities for design involve trade-offs of volume of air space used, passenger comfort and computer complexity. Incremental normal accelerations $a_n$ due to lateral maneuvers occurring simultaneously must be taken into consideration before a choice is made. These may be determined from the equation $$a_n = g \tan \phi \sin \phi \qquad (21)$$

Bank angles of 27.5° result in 0.24 g normal to the aircraft floor, whereas 20° results in 0.125 g. These accelerations add to vertical accelerations in some cases, resulting in potentially very uncomfortable levels. It is further noted from equation (20), that N is inversely proportional to $a_z$. Thus, $a_z$ may be reduced at the expense of increased N, but anything less than 0.05 g becomes quite unrealistic inasmuch as the payoff is small compared to further reduction in bank angles. The configuration of the lateral steering has a bearing on the ultimate choice. The design objective is to maintain constant rate of change of flight path angle along the arc length L.

It should be noted that the factor $k$ of equation (12) is interrelated with the final value of $l$, denoted L above. In particular $$\Delta \gamma = kL \qquad (22)$$

Equation (12) may be rewritten, using the relationship (22) to replace the undefined $k$.

$$\gamma_P = \gamma_1 + \Delta\gamma_P/L \; l \qquad (23)$$

$l$ may vary within the bounds $O \leq l \leq L$. It should be noted that $$\Delta\gamma_P = \gamma_2 - \gamma_1 \qquad (24)$$

where $\gamma_2$ is the flight path angle of the outbound wayline.

The path to be navigated is to be invariant with respect to wind. This is accomplished by replacing $t$ with distance along the curved path $l$ in all the equations and compensating for speed.

Equation (23) substituted in equation (11) yields the desired vertical acceleration. Integration of equation (13) may be performed and time dependence eliminated $$\overset{\circ}{h}_{co} = \int_o^l a_z \cos(\gamma_1 + \Delta\gamma_P/L \; l) dl + (\overset{\circ}{h}_{co})_s \qquad (25)$$

substituting: $dl = Vdt$ $$\overset{\circ}{h}_{co} = \int_o^l a_z/V \cos (\gamma_1 + \Delta\gamma_P/L) \; dl + (\overset{\circ}{h}_{co})_s \qquad (26)$$

Evaluating the integral $$\overset{\circ}{h}_{co} = a_z L/V\Delta\gamma_P \{\sin (\gamma_1 + \Delta\gamma_P/L \; l) - \sin \gamma_1\} + (\overset{\circ}{h}_{co})_s \qquad (27)$$

Resubstituting equation (23)

$$\overset{\circ}{h}_{co} = a_z L/V\Delta\gamma_P \{\sin \gamma_P - \sin \gamma_1\} + (\overset{\circ}{h}_{co})_s \qquad (28)$$

Using equation (14) for altitude command $$h_{cp} = \frac{a_z L^2}{V^2 \Delta\gamma_P^2} \left[ \cos\gamma_1 - \cos\gamma_P \right] - \frac{a_z L l}{V^2 \Delta\gamma_P} + \frac{(\overset{\circ}{h}_{co})_s l}{V} + (h_{co})_s \qquad (29)$$

FIG. 4 shows the relevant stages of the navigation computation.

Figure 5:
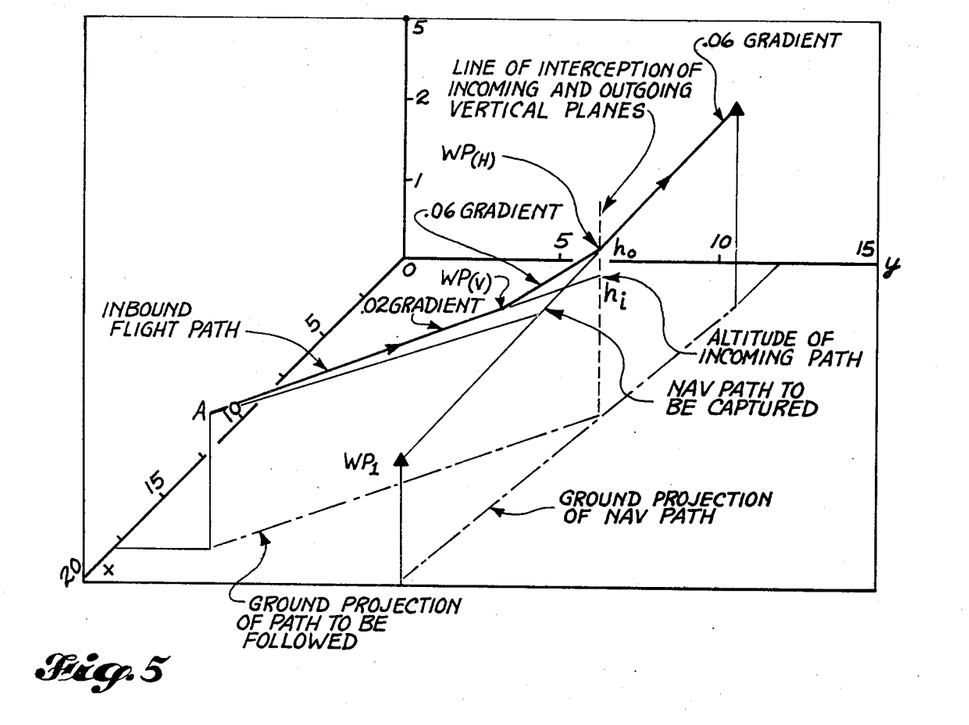
FIG. 5 is a diagrammatic representation illustrative of NAV path capture of a straight line path.

Returning now to the method and manner in which the present system provides for NAV path capture (of a straight line path), it will be noted making reference now to FIG. 5 that the waypoints which define a NAV path to be captured define a vertical plane. After NAV engagement in the arm state, the NAV computer continuously computes a point of of intercept with the plane of waypoints. This point gives the lateral coordinates of the point of interception for the lateral axis control, called WP (H) on the illustration, FIG. 5. The vertical coordinate of WP (H) is the height of the NAV path. If the projected point of intercept lies below the height of the NAV path, a vertical waypoint WP (V) is computed ahead of WP (H). If the projected point lies above the NAV path, the vertical waypoint computed lies behind WP (H), in the plane defined by the waypoints.

WP (H) coordinates are computed by simultaneous solution of the equations for the ground projections of the incoming and outgoing paths, where the incoming must be computed continuously.

The equation of the outbound path $$\frac{x_0 - x_1}{x_2 - x_1} = \frac{y_0 - y_1}{y_2 - y_1} \qquad (30)$$

where $x_1, y_1, x_2, y_2$ are waypoint coordinates. Equation of the inbound path is $$x_i - x_P/l = y_i - y_P/m \qquad (31)$$

Where $x_P, y_P$ are the coordinates of the present location and $l, m$ are direction numbers (i.e., proportional to direction cosines).

The coordinates of the waypoint WP (H) $(x_H, y_H, h)$ (where altitude is not of interest at this time) is the result of simultaneous solution of equations (30) and (31).

$(x_2 - x_1)(y_0 - y_1) - (y_2 - y_1)(x_0 - x_1) = 0$
$-(x_2 \; x_1)y_0 + (y_2 - y_1)x_0 = -(x_2 - x_1)y_1 + (y_2 - y_1)x_1$
$m(x_i - x_P) - l(y_i - y_P) = 0$
$mx_i - ly_i = mx_P - ly_P$ $$\begin{bmatrix} y_2 - y_1 & -(x_2 - x_1) \\ m & -l \end{bmatrix} \begin{bmatrix} x_H \\ y_H \end{bmatrix} = \begin{bmatrix} (y_2 - y_1)x_1 - (x_2 - x_1)y_1 \\ mx_P - y_P \end{bmatrix}$$

Altitude of the outgoing path:

$$h_0 = h_1 + d/D(h_2 - h_1)$$

where
$$d = \sqrt{(x_H - x_1)^2 + (y_H - y_1)^2}$$
$$D = \sqrt{(x_2 - x_1)^2 + (y_2 - y_1)^2}$$

Altitude of the inbound path at the horizontal waypoint:

$$h_i = h_P + D_i n_i$$

where $n_i$ is the direction cosine of the inbound path, $\eta$ $$D_i = \sqrt{(x_P - x_H)^2 + (y_P - y_H)^2}$$

$h_P$ is the current altitude on the inbound path. If $h_i > h_o$ — then WP (V) is computed on the outbound path. If $h_i < h_o$ — then WP (V) is computed on the inbound path. For $h_i < h_o$, distance along the inbound path, $$D_V = (h_o - h_i)/\eta_i$$

and the coordinates of WP $(V) = (x_V, y_V, h_V)$ are computed from:
$$x_V = x_H - D_v l_i$$
$$D_V = y_H - DD_v m_i$$
$$h_v = h_i - D_v n_i$$

for $h_i > h_o$ computation is executed on the outbound path.

Figure 7:
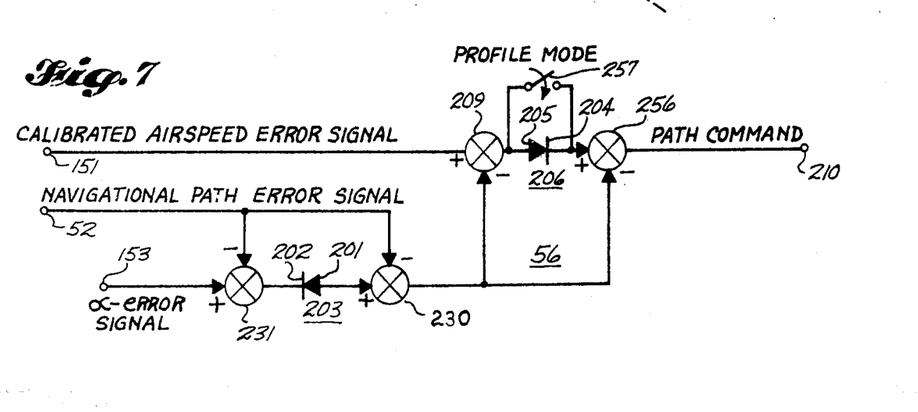
FIG. 7 is a circuit schematic diagram of the midvalue selection means shown in block form in the system of FIG. 6.

Turning now to a detailed discussion of the system embodiment of FIG. 6 and novel circuit of FIG. 7 which may be utilized as the mid value signal selecting means in FIG. 6, it should be first mentioned that the system of FIG. 6 provides straight line and curved transition path computation, with over and underspeed protection. Capture is achieved by supplying waypoints as discussed in the immediately preceding portion of this specification. The system of FIG. 6 generates a pitch attitude command to be coupled to the pitch computer of the autopilot and flight director. Aside from path control, the system of FIG. 6 shows the implementation of the protection against excessive commanded climb rate. The system utilizes angle of attack information and the aircraft stall characteristics, and causes navigation command to be overridden in the event of an excessive angle of attack. Similarly, overspeed is protected against as can be noted from the system block diagram and the description hereinafter given.

Storage of flight profile in a memory and associated computer means for calculating and providing signals representative of distances between waypoints and techniques for providing these and similar computations are well known in the art as shown e.g. in the patent literature including the aforementioned U.S. Pat. No. 3,705,306 and no novelty is claimed therefore with respect thereto, or memory and associated computer means for calculating and providing signals representative of the "to" waypoint altitude shown in block 22, signals representative of distance from an effective waypoint shown in block 20, or signals representative of flight path angle shown in block 24. Basic DME information received from the ground, and the flight profile stored in memory, are utilized to provide signals representative of the distance from the next waypoint represented by block 20. The term "effective waypoint" denotes that the distance is measured to the point on the bisector of the horizontal waypoint angle. Block 22 is representative of the means in the memory for providing a signal stored therein representative of the next waypoint. Block 24 is representative of computer means for calculating and providing a signal representative of the required flight path angle utilizing distance and the waypoint altitudes. A signal representative of altitude correction is computed by multiplier circuit means 26 and combined in adder circuit means 101 with signal 22 representative of waypoint altitude to provide a signal 28 representative of altitude command. An ambient pressure corrected signal representative of barometric altitude is provided by Baro — altitude means 30 and subtracted in combining means 103 to provide a signal 32 representative of altitude error. A signal 34 representative of ground speed is computed from VOR - DME data (or may be derived from INS), and when multiplied by multiplier circuit means 105 with a signal representative of flight path angle 24, provides a signal 84 representative of altitude rate command appropriate to the aircraft position relative to the two three-dimensionally defined waypoints defining a flight leg. When the inequality $$k|V_G \Delta\gamma| \geq |h - h_C|$$

where $V_G$ = ground speed in ft/sec; $\Delta\gamma$ = path change in radians; $h$ = measured altitude; and $h_C$ = altitude satisfying the waypoint pair following the current one, is satisfied by computational means of blocks 20, 22, and 24 (responsive to signals representative of the defined parameters), then blocks 20, 22, and 24 produce the respective output signals satisfying the next waypoint pair. This occurs when the above inequality is computed and equality satisfied even though the aircraft is actually not between the waypoints but still between the two previous waypoints. In the aforementioned legswitch equation computation, $\Delta\gamma$, a signal representative of change in flight path angle is provided. The absolute value of the product of flight path angle change and ground speed 34 is provided, and a scaled value of the resulting signal is compared to the absolute value of a signal 32 representative of altitude error, legswitch occurring to provide output signals from 22, 20, and 24 based upon the next waypoint pair when the aforementioned comparison yields equal magnitudes.

Scaling in the aforementioned legswitch equation is selected to match the gain of amplifier means 38 in order that the combined output signals 34 and 28 are of equal magnitude before and after legswitch. Blocks 42 and 44 comprise means for providing signals representative respectively of vertical acceleration and barometric altitude rate which signals are suitably combined (the vertical acceleration signal first coupled through amplifier means 107 having a gain of 1) in adder circuit means 46 and coupled through lag circuit means 48 (having a time constant equal to the gain of amplifier means 107) to generate a signal 40 representative of altitude rate of the aircraft, thereby avoiding difficulties associated with the use of pure barometric altitude rate 44 as typically generated by the aircraft air data computer using pitot-static information. Such air data computer information is typically noisy, lags behind actual altitude rate and may include effects due to changing angle of attack. Block 42, representative of means for providing a signal representative of vertical acceleration, may in practice comprise an input from an INS, or may comprise the output from a body mounted vertical accelerometer. The output of amplifier circuit means 38 providing the gain shown in the block is combined in summing circuit means 109 with the hereinbefore discussed signal 84 to provide the signal 39 representative of $h_C$ (which signal 39 may be provided as noted earlier by an alternative method of computation shown and discussed in connection with the computational steps shown in FIG. 4). Signal 40 is subtracted in combining means 111. Incidentally, all polarities are defined in the schematic of FIG. 6 assuming the up direction of the aircraft to be positive. The resultant signal 50 at the output of combining means 111 is representative of path error and satisfied when both altitude and altitude rate command are satisfied. For other conditions the command will cause the aircraft to converge onto the path. This path error signal 50 is increasingly attenuated with increasing airspeed. Utilization of true airspeed 113 coupled through gain scheduling means 54 as shown is optional. An alternative embodiment may utilize calibrated airspeed.

For well chosen flight paths with ordinary wind levels signal 52 downstream of amplifier means 115 will be middle valued with respect to the inputs shown coupled to mid value selector circuit means 56 and therefore the output of mid value selector circuit means 56 will be the same value as the input 52 thereof. Noise filter circuit means 58 may be provided to process the output signals from mid value selector circuit means 56 or noise filtering may be done as part of the pitch autopilot shown coupled further downstream. In any case, the signal representative of path error is subsequently transmitted as shown through a proportional path 60 and an integral path 62 as command input to inner loop control of the elevator consisting of pitch attitude and pitch rate feedback. The system is intended as mentioned earlier to protect the aircraft from command signals 52 which exceed aircraft capabilities. Whenever command signal 52 exceeds the climb capability of the aircraft, that is, with thrust set at its limit, the aircraft will lose airspeed and as airspeed is lost, angle of attach will increase. Block 64 is a means for providing a signal representative of angle of attack which may come by measurement by one or two vanes or be computed by conventional means from the equation $\alpha = \theta - \gamma$, where $\theta$ and $\gamma$ are pitch attitude and flight path angle respectively. Angle of attack signal at 64 is combined with a reference signal 68 in subtractor means 66. The aforementioned reference signal 68 is provided by means of program scheduling at 70 of flap position from flap position indicator means 72. Programmed scheduling at 70 is utilized to generate an angle of attack reference so that the aircraft does not decelerate below safe minimum speeds. The output of the aforementioned subtractor means 66 is further combined with a signal at 119 representative of pitch rate of the aircraft at subtraction means 74 and coupled through scaling means 121 to mid value selector circuit means 56, pitch rate being used to provide damping for the control loop.

Analogous in intent to the hereinabove described provisions for underspeed protection, overspeed protection hereinafter now described is also provided.

An error signal 180 is generated by comparing (in combining means 131) calibrated airspeed at 76 to a signal representative of speed reference at 78. A speed reference signal 78 corresponds to maximum permissable speeds and are aircraft configuration dependent and also derived from flap position information already available in the aircraft. Switching means 80 is shown for coupling a calibrated airspeed command signal to combining means 131 instead of a speed reference signal 78 in the profile mode.

It may be noted that mid value selector circuit means 56 inhibits the midvalued signal and switches to input 151 when profile mode of operation of the system is selected. A specific circuit for satisfying this switching function and providing mid valued signal selection without logic circuits or switching in the circuit path of the three signals shown as inputs 151, 52, and 153 is shown in now to be described FIG. 7.

With specific reference now to the circuit of FIG. 7, it will be noted that there are no mechanical switching means in the signal circuit paths and no complex logic selecting or sensing schemes for the three signals in order to select the mid valued amplitude signal. Transition between modes advantageously occurs in the circuit of FIG. 7 substantially transient free. A first signal viz. a calibrated airspeed error signal 151 is coupled as a first input to first combining means 209 comprising subtractor circuit means. A second signal viz. a navigation path error signal 52 is coupled as a first input to second combining means 230 comprising combining means, said second signal 52 also coupled as a first input to third combining means 231 comprising a subtractor circuit. A third signal viz. an error signal is coupled to a second input of third combining means 231. The anode 202 of first diode means 203 is coupled to the output of third combining means 231, and the cathode 201 thereof is coupled to the second input of second combining means 230. The output of second combining means 230 is coupled (by direct connection) to the second input of first combining means 209 and also to the first input of fourth combining means 256, the fourth combining means comprising subtractor circuit means. Second diode means 206 has the anode 205 thereof coupled to the output of first combining means 209 and the cathode 204 thereof coupled to the second input of fourth combining means 256. Switching means 257 normally in the open position is closed for the profile mode to provide the first input signal 151 as the output signal 210, instead of performing the mid valued selection function with respect to the first 151, second 52, and third 153 input signals. Looking now back into the system of FIG. 6 and considering the implementation of block 56 therein as the circuit of FIG. 7, for the profile mode, one diode 206 in mid value selector circuit means 56 is bypassed (by closing normally open position switch 257) and in FIG. 6, switch 80 (also normally closed when not in the profile mode) is open and speed reference 82 provides a signal satisfying aircraft speed requirements, i.e. speed limits, time schedule requirements, and fuel consumption are the criteria for selection.

What is claimed is:

1. In combination in a system for generating pitch attitude command signals for controlling the flight path of an aircraft:
   means for generating a signal representative of navigation path error;
   means for providing a signal representative of calibrated airspeed;
   means for generating a speed reference signa;
   means for combining said signal representative of calibrated airspeed with said speed reference signal to provide an output error signal;
   means for providing a further signal responsive to pitch rate, angle of attack, and flap information signals; and,
   mid value signal selecting circuit means responsive to said signal representative of navigation path error, said output error signal, and said further signal for selecting the mid value of the aforesaid signals and providing said pitch attitude command signals.

2. The combination according to claim 1 wherein said speed reference signal is representative of the maximum permissible speed of the aircraft.

3. A flight control system for an aircraft comprising in combination:
means for providing an angle of attack error signal;
means for providing a navigation path error signal;
means for providing a calibrated airspeed error signal;
means responsive to each of said aforementioned means for selecting the mid value amplitude of the aforementioned signals for path command control of the aircraft.

4. The flight control system according to claim 3 further including profile mode selecting means for providing a speed reference signal for path command control of the aircraft.

5. In combination in a flight control system for an aircraft:
means for providing a signal representative of groundspeed;
means for providing a signal representative of required flight path angle;
means for providing a signal representative of distance from effective waypoint;
means for providing a signal representative of altitude of the next waypoint;
means for providing a signal representative of barometric altitude;
first multiplier circuit means responsive to said signal representative of grounspeed and said signal representative of required flight path angle for providing a first output signal;
second multiplier circuit means responsive to said signal representative of required flight path angle and said signal representative of distance from effective waypoint for providing a second output signal;
first adder circuit means responsive to said second output signal and said signal representative of altitude of the next waypoint for providing a third output signal;
second adder circuit means responsive to said third output signal and said signal representative of barometric altitude for providing a fourth output signal;
third adder circuit means responsive to said first and fourth output signals for providing a fifth output signal, said fifth output signal representative of $h_c$.

6. The combination in a flight control system for an aircraft according to claim 5 further including:
means for providing a signal representative of vertical acceleration;
means for providing a signal representative of barometric altitude rate;
fourth adder circuit means responsive to said signal representative of vertical acceleration and said signal representative of barometric altitude rate for providing a sixth output signal;
first lag filter circuit means responsive to said sixth output signal for providing a seventh output signal; and,
fifth adder circuit means responsive to said fifth and seventh output signals for providing an eighth output signal, and said eighth output signal representative of flight path error.

7. The combination in a flight control system for an aircraft according to claim 6 further including:
means for providing a signal representative of airspeed;
gain scheduling circuit means responsive to said signal representative of airspeed for providing a further output signal; and,
means for combining said eight output signal and said further output signal for providing another output signal.

8. The combination in a flight control system for an aircraft according to claim 6 further including:
means for providing an angle of attack error signal;
means for providing a calibrated airspeed error signal;
mid value signal selection means responsive to said fifth output signal, said angle of attack error signal, and said calibrated error signal for providing a ninth output signal; and,
utilization means responsive to said ninth output signal for providing path command control of the aircraft.

9. The combination in a flight control system for an aircraft according to claim 8 wherein said means for providing an angle of attack error signal comprises:
means for providing a signal representative of aircraft flap position;
first combining means having first and second input terminals and an output terminal;
gain scheduling means responsive to said signal representative of flap position for providing a signal coupled to said first input terminal of said first combining means;
means for providing a signal representative of angle of attack coupled to said second input terminal of said first combining means;
second combining means having first and second input terminals and an output terminal;
means for providing a signal representative of pitch rate, said pitch rate signal coupled to said first input terminal of said second combining means, and said second input terminal of said second combining means coupled to said output terminal of said first combining means, said output terminal of said second combining means providing said angle of attack error signal.

* * * * *